United States Patent
Wolff et al.

(10) Patent No.: US 7,289,685 B1
(45) Date of Patent: Oct. 30, 2007

(54) PAPER BASED METHOD FOR COLLECTING DIGITAL DATA

(75) Inventors: Gregory J. Wolff, Redwood City, CA (US); Daja Strassberg-Phillips, Palo Alto, CA (US); Jonathan J. Hull, San Carlos, CA (US); Arne Elliott, San Francisco, CA (US)

(73) Assignee: Ricoh Co., Ltd., Tokyo (JP)

( * ) Notice: Subject to any disclaimer, the term of this patent is extended or adjusted under 35 U.S.C. 154(b) by 628 days.

(21) Appl. No.: 10/117,017

(22) Filed: Apr. 4, 2002

(51) Int. Cl.
 *G06K 9/20* (2006.01)
 *B42D 15/00* (2006.01)
(52) U.S. Cl. .................. 382/317; 382/312; 382/313; 283/70
(58) Field of Classification Search ................ 382/317, 382/203, 309, 313, 312; 358/450, 402, 404, 358/407, 468, 473
 See application file for complete search history.

(56) References Cited

U.S. PATENT DOCUMENTS

| | | | | |
|---|---|---|---|---|
| 5,060,980 A | * | 10/1991 | Johnson et al. | 283/70 |
| 5,933,823 A | * | 8/1999 | Cullen et al. | 707/6 |
| 6,081,629 A | * | 6/2000 | Browning | 382/313 |

* cited by examiner

*Primary Examiner*—Duy M. Dang
(74) *Attorney, Agent, or Firm*—Blakely, Sokoloff, Taylor & Zafman LLP

(57) ABSTRACT

A method and apparatus for collecting digital data. In one embodiment, the method comprises receiving data input by scanning a sheet of paper using a scanner on a machine, identifying the sheet of paper as a form having one or more fields of user entered data to validate, validating the user entered data using a user interface on the machine, and sending the user entered data to a backend system.

36 Claims, 13 Drawing Sheets

FIG. 2

| EMPLOYEES | ID NUMBERS |
|---|---|
| BROWN | 1 |
| JONES | 2 |
| SMITH | 3 |
| WILLIAMS | 4 |

FIG. 4

| Form Name | Form Number |
|---|---|
| Auto registration | 001 |
| Watercraft registration | 002 |
| Certificate of non-operation | 003 |
| Driver license renewal | 004 |
| Application for handicapped parking | 005 |
| Transfer of liability | 006 |
| Evidence of insurance | 007 |
| Non-driver ID card | 008 |

FIG. 5

RECEIPT

Marie Lanz                                                                                          March 2, 2002
123 Alameda Ct.                                                                     Ricoh California Research Center
Menlo Park. CA 94110                                                                          Menlo Park, CA 94025

Change my pre-tax deduction to:

1. 8% Use whole percentages 1-15%. Highly compensated employees max 8%.

Select % to invest in the following funds, investing in 20% blocks.
    2. 25%     Magellan
    3. ☐ %     Equity
    4. 75%     Growth and Income
    5. ☐ %     Puritan 6. ☐ %     Four-in-One Index Fund 7. ☐ %     Spartan Money Market Confirmation of Transaction
Received by Fidelity Investments 100 Front Street. Boston. MA 01415
        at 132.80.177
Time         4:05:07p| Friday 02 March 2002
Transaction #  2145-7KS7

_____                                        _____
Signature                                                                                                   Date Correction Instructions - watermark/approval confirmation seal
This transaction becomes final at 4:15:07pm Friday 02 March 2002.
To make corrections before that time, scan this sheet.
To make corrections after that time, print a new form and begin again.

FIG. 8

Reminder of open transactions

Welcome, Jane Doe

PENDING TRANSACTIONS

| Name of form | Creator | Date | Status | Comment |
|---|---|---|---|---|
| SCHEDULE C | J. DOE | 3/1/02 | NOT PRINTED | DUE 4/15/02 |
| AUTO REGISTR. | J. DOE | 2/15/02 | NOT XCOPIED | |
| 401K CHANGE | K. RIDEOUT | 1/15/02 | NO RECEIPT | Physician letter needed |
| SA REIMBURS. | K. RIDEOUT | 1/14/02 | NO RECEIPT | |
| | | | | |

PAPER BASED METHOD FOR COLLECTING DIGITAL DATA

FIELD OF THE INVENTION

The present invention relates to the field of paper-based processing of data; more particularly, the present invention relates to scanning forms to obtain user entered data, locating the user entered data on the forms based on location information printed on the form, verifying the data, and forwarding the data to other locations specified on the forms.

BACKGROUND OF THE INVENTION

There are many different technologies for processing forms. A number of these technologies handle forms in an automated fashion. Because of the automated processing, it is possible that errors may be made in identifying user entered data on the forms. In fact, such errors often do occur. Existing optical character recognition (OCR) based image/forms processing systems require substantial amount of manual transcription to achieve the accuracy necessary for entry into most business databases. The labor and system costs are borne by the receiving organization. Furthermore, errors in the transcription result in miscommunications and delays that cost both the sender of the form and the receiver. Thus, all these processes appear to be open loop in that the individual providing the form never validates the data.

Paper user interfaces have been described that allow commands to be executed via fax or copier. However, these interfaces also have the same limitation in that they do not provide any validation step that allows the recognized input to be validated before the operations take place.

SUMMARY OF THE INVENTION

A method and apparatus for collecting digital data. In one embodiment, the method comprises receiving data input by scanning a sheet of paper using a scanner on a machine, identifying the sheet of paper as a form having one or more fields of user entered data to validate, validating the user entered data using a user interface on the machine, and sending the user entered data to a backend system.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 2 illustrates an exemplary form.

FIG. 4 illustrates a screen listing names and ID numbers for multiple users.

FIG. 5 illustrates an exemplary form listing.

FIG. 8 illustrates an exemplary receipt.

FIG. 9 illustrates an exemplary of this list of forms.

DETAILED DESCRIPTION OF THE PRESENT INVENTION

Figure 1:
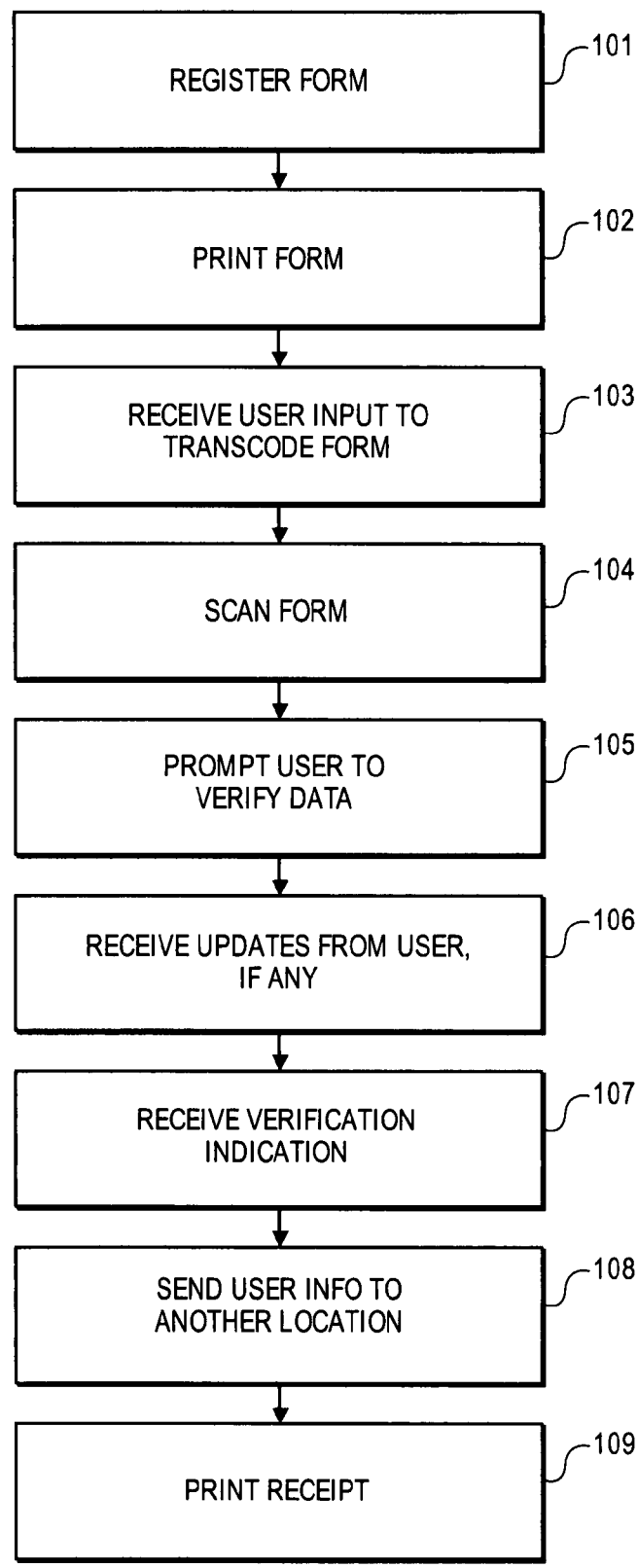
FIG. 1 is a flow diagram of one embodiment of a tXt process.

A distributed technique is disclosed for interacting with databases that includes printing forms, filling them out, performing optical character recognition (OCR), data validation, and database communication. This is referred to herein as a "tXt" process because it creates ASCII text (tXt) by translating handwritten characters. It differs from other systems in that data may be validated at scan time on the multi-function peripheral (MFP) (e.g., a computer system) usually by the person who filled out the form. Also disclosed is one embodiment of an architecture to enable a single MFP to be used with forms originating from many different organizations while guaranteeing secure data delivery.

Additional novel features include the immediate issuance of a receipt, the use of print cover sheets to remind people of pending tasks, and a technique for collecting transaction fees.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview of the tXt Process

Figure 2:
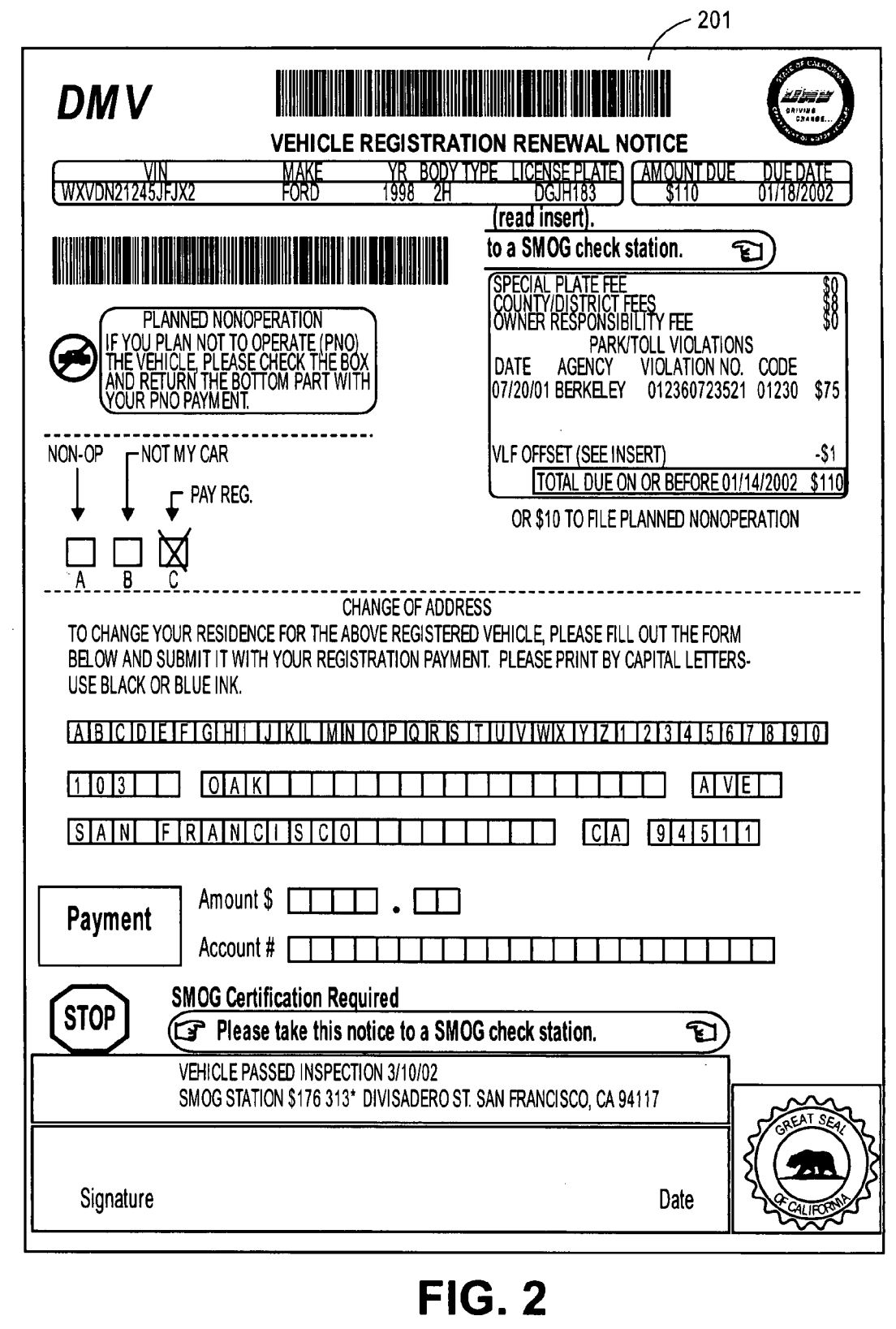

FIG. 1 is a flow diagram of one embodiment of a tXt process. In FIG. 1, the entity providing forms and receiving information from individuals is referred to as the form originator and the person who fills out the form is referred to as the user. FIG. 2 illustrates an exemplary form.

Referring to FIG. 1, a tXt machine (e.g., a modified MFP) registers a form from a form originator (processing block 101). The tXt machine may comprise a computer system that has the functionality of a scanner, a printer, a display panel (e.g., liquid crystal display (LCD)), transmitter and/or network connection, and processing to identify marks made by user on forms and process those marks. In one embodiment, the form includes a digitally encoded description of the fields that are to be filled in by a user. The digital description may include the printed representation along with meta data defining where input fields are, their legal values, and logical dependencies between fields, if any. The field specification may include whether recognition is to be applied to a particular filed and/or the field type. This digital description may be in the form of a bar code placed on the form, such as bar code 201, digital paper, ID tags (with chips on paper). In one embodiment, the digitally encoded information includes information that may be used to fill out portions of the forms with user specific information (e.g., name, address, previous selections of the user, etc.)

In one embodiment, the form originator may also register their form with an intermediary service (described in more detail below). This registration is performed electronically through an intermediary service. In an alternative embodiment, this registration is performed by simply placing a paper version of the form (with the digitally encoded specification) on tXt machine (or other machine, server, database, etc.) and pressing a prespecified "register" button, which causes the form to be registered.

The form may be stored in a database accessible to and/or part of the tXt machine. In one embodiment, the tXt machine stores an image of the original form along with a pointer that ties it to the database entry.

Next, the tXt machine prints the form on a tXt machine in response to a user request (processing block 102).

Figure 3:
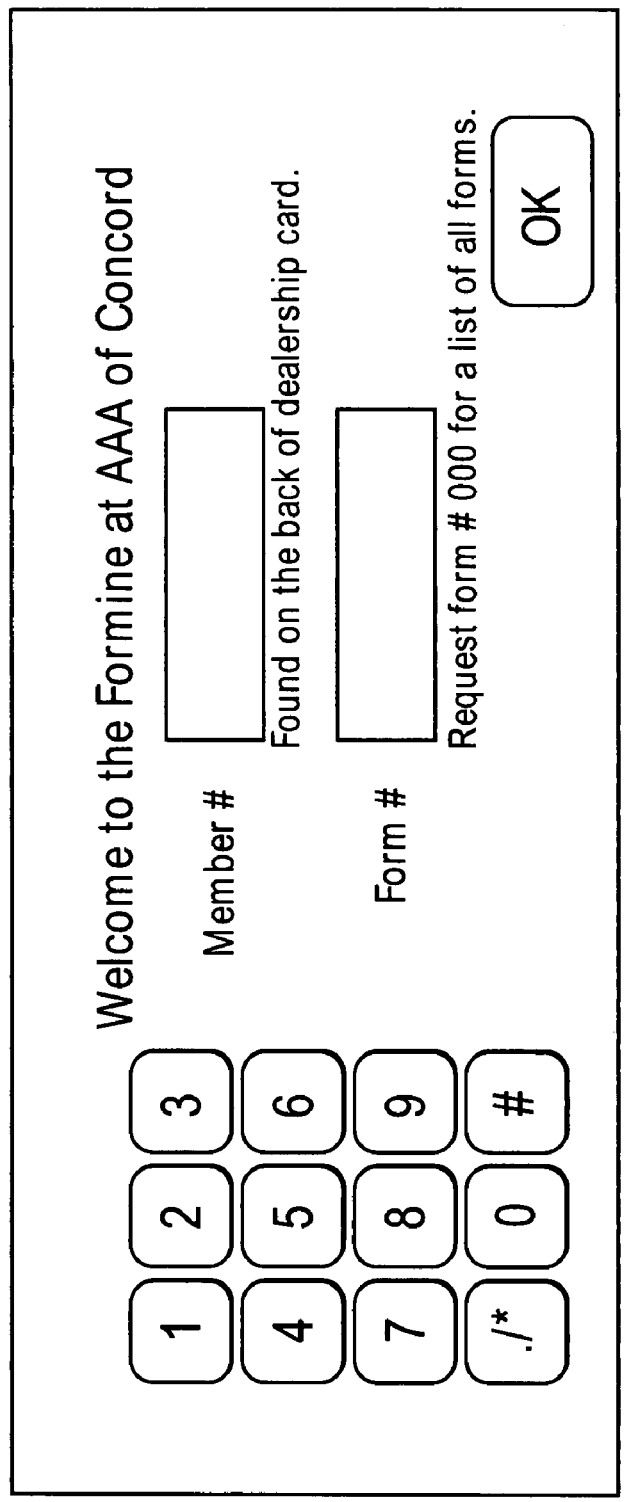
FIG. 3 illustrates an exemplary touch screen interface to enter identification information.

In one embodiment, prior to printing out a document, the user initially identifies herself to the tXt machine. This identification may be in the form of entering a name and/or one or more other identifiers (e.g., a Pin, a password, employee ID #, social security number, etc.) and may be part of a login process. FIG. 3 illustrates an exemplary touchscreen interface to enter identification information, referred to as the member #. FIG. 4 illustrates a screen listing names and ID numbers for multiple users. Alternatively, the user could identify themselves by swiping a smart card or credit card. Such identification may occur for the verification process described below.

In one embodiment, the user selects from a menu or by typing number to print out the form. The interface of FIG. 3 may be used to specify a form. FIG. 5 illustrates an exemplary form listing. In some cases, several forms may be printed out at once. These might include all of the steps necessary for a particular task (e.g. documenting a new hire). In one embodiment, once identified, the tXt machine uses profile information stored, either locally or remotely, of the user to fill out or partially fill out the form prior to printing.

In an alternative embodiment, the user may have received the form preprinted (e.g. in the mail).

After printing the form, the user fills out the paper form, places the form on a tXt machine, and indicates to the tXt machine that the user wishes to have the form transcoded. The user may fill out the form by entering numbers, checking boxes, marking areas on the form, filling in missing information, or one or more of the other well-known ways in which a form is filled out. FIG. 2 also illustrates an exemplary form filled out.

The tXt machine receives the indication from the user to transcode the form that had been placed on the machine (processing block 103). In one embodiment, the indication comprises a signal generated in response to, for example, the user pressing a button on a user interface (e.g., touchscreen) of the tXt machine, selecting an option or input location on a user interface of the tXt machine, etc. Alternatively, in one embodiment, after scanning a form having the digitally encoded information described above, the tXt machine automatically performs transcoding.

In response to receiving the indication, the tXt machine scans the form (processing block 104). The tXt machine scans the form using optical character recognition (OCR) to identify the entered information. In one embodiment, the tXt machine locates the barcode on the document that contains information that identifies the document and identifies where on the document user entered responses may be found. Using the location of the barcode, the tXt machine is able to determine the orientation of the paper and, from the orientation and data in the barcode indicating the location(s) where user entered data can be found, determines if the user entered data inputs.

The digital information on the scanned form may include a complete description of the form (in which case the tXt machine can operate independently). In one embodiment, the tXt machine compares the scanned image with the original printout to perform form subtraction. The results of the form subtraction are an indication of the user entered marks. The specified regions are then sent to OCR for preliminary processing. Depending on the confidence level and field specification, the tXt machine presents these recognition results to the user along with the close matches for verification or selection of an alternative by the user. The determination of the confidence levels for a particular field may be based on, for example, the grammer or allowable values, for a particular field (e.g., a field requiring a numeric input receiving a non-numeric input receives a low confidence level).

Thereafter, the tXt machine prompts the user to verify the data entered in the specified fields (processing block 105). The prompt to the user may take many formats. For example, the tXt machine may display the results on a display (e.g., LCD panel) on or coupled to the tXt machine. Using the keypad or some other input device, the user is able to enter corrections or changes to the data.

During verification, the tXt machine may receive updates from the user to the data entered on the form (processing block 106). In one embodiment, the tXt machine provides a user interface (e.g., touchscreen) to receive input from the user to overwrite any incorrect fields. The user interface may comprise the same user interface used to select the form and/or cause the transcoding of the form by the tXt machine. Using the user interface, a user is able to cycle through and review their inputs.

In one embodiment, if the user places a line through, or some other predefined mark on, one of their inputs on the paper form, the tXt machine recognizes this and automatically prompts the user on the display panel of the tXt machine for the data for that entry.

Subsequently, the tXt machine receives a verification indication from the user that the tXt machine has the current data that the user wants processed (processing block 107). Such a verification indication may be made by the user pressing a button on a user interface (e.g., touchscreen) of the tXt machine, selecting an option or input location on a user interface of the tXt machine, etc. Thus, using this process, the user of the form is able to confirm the information on the form prior to the information being sent to another location.

Data verification can also be performed by the tXt machine printing out a copy of the form with the best guess recognition results.

During verification, the tXt machine could indicate to the user that certain inputs are not allowed (e.g., data input not within allowable range, not correct type, combination doesn't meet required criteria). This determination could be based on information obtained by the tXt machine from the digitally encoded information (e.g., barcode) on the form, which could set the requirements.

Figure 6:
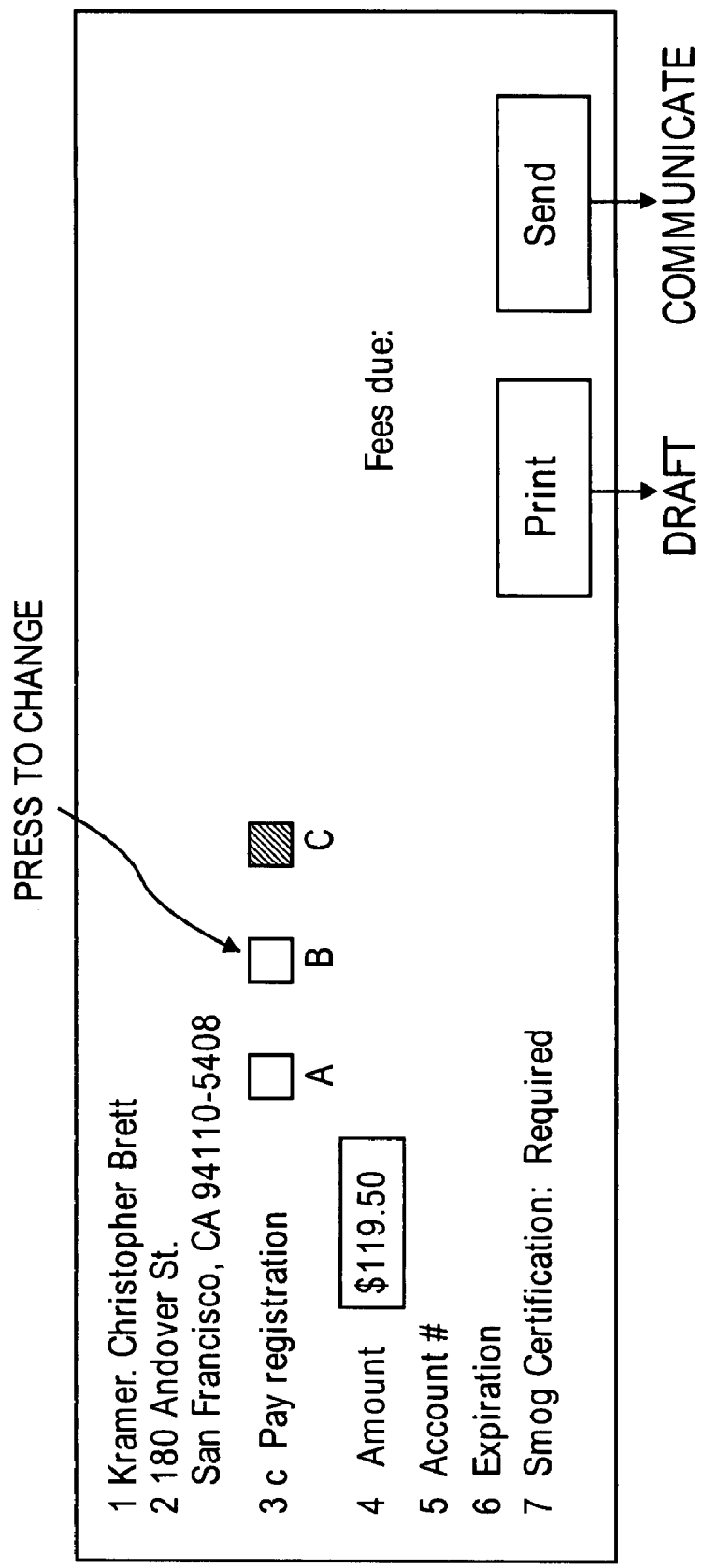
FIGS. 6 and 7 are examples of user interfaces on the tXt machine.
Figure 7:
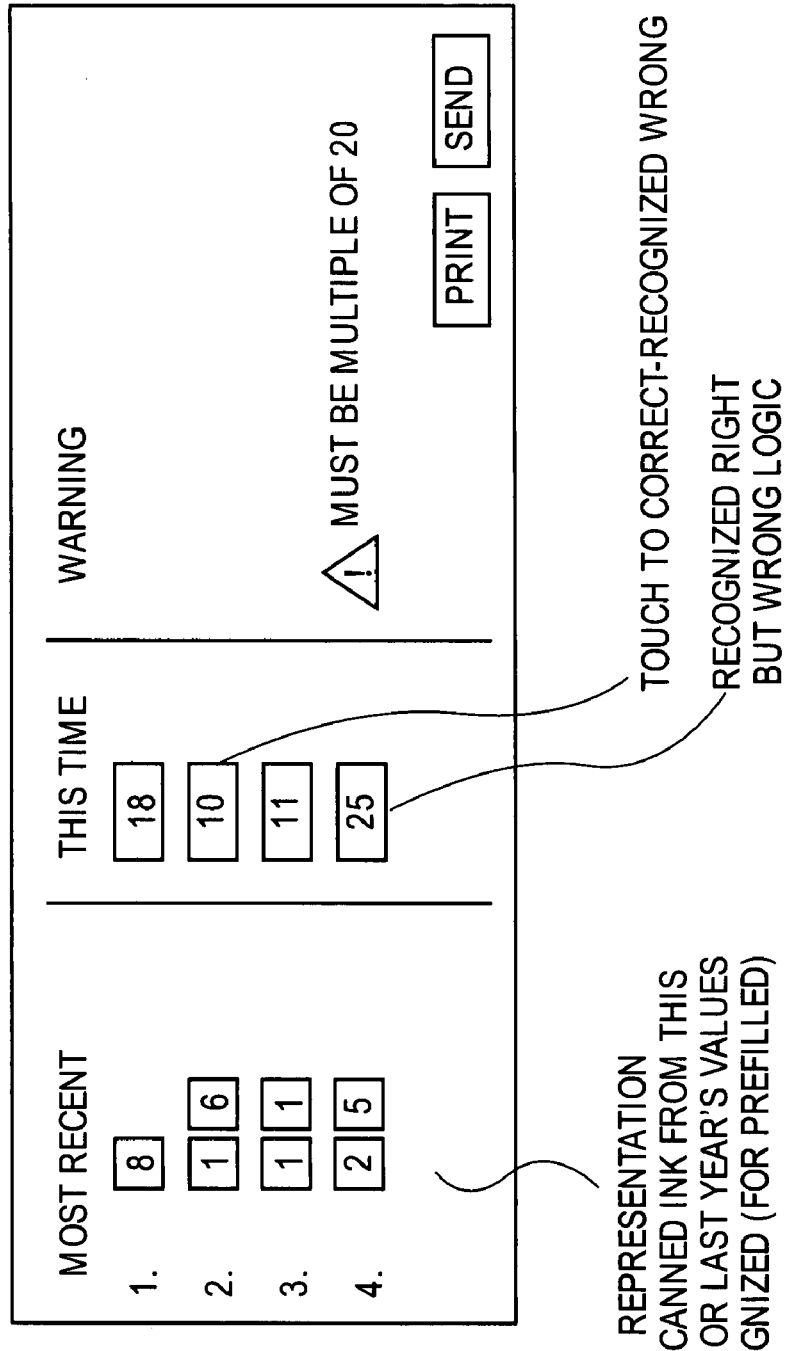

FIGS. 6 and 7 are examples of user interfaces on the tXt machine to review user entered data, make changes to the data, and signal a verification indication to the tXt machine when the user is satisfied that the tXt machine has the correct data. Referring to FIG. 6, the print button allows the user to print a draft of the form, while the send button allows the user to signal the verification to the tXt machine to have the data sent. The user interfaces may use cursor control keys as well to make selections. Alternatively, as shown in FIG. 7, which shows previously selected values and the currently scanned values, which are taken from the form, the user can simply select an input to change by touching the information on the screen and selecting another input to replace it.

Once the tXt machine receives a verification indication from the user, the tXt machine sends the user's information to the form originator (or some predetermined location specified by the form originator) (processing block 108). In one embodiment, the data is sent to a location specified in the digital data (e.g., barcode) on the form. In one embodiment, the user may indicate a destination for the form data. In such a case, the user may be overriding the destination identified by the form. This destination may be an email address.

In one embodiment, the tXt machine converts the data into a format. In one embodiment, this format may comprise an XML format. The XML format may be specified by the digitally encoded description of the form that was provided by the form originator. In one embodiment, this description also includes a location to which the data is to be sent. This description may further include a public encryption key for use in encrypting the data for security.

The tXt machine prints out a receipt containing the information that the user entered digitally encoded (processing block 109). In one embodiment, the receipt page may include an image of the original form (scaled) with the entry boxes printed with the recognized printed characters. The receipt may also include a time stamp of when the data was entered and/or printed and a machine identifier to identify the tXt machine that printed the receipt and/or sent the user entered information. The receipt page might also include list forms that the user has printed but not yet entered into the system (e.g., scanned in). This is analogous to a "to do" list. FIG. 9 illustrates an exemplary of this list of forms. The same tXt machine may be used for any type of form from any provider. Also, in one embodiment, the receipt can be used to regenerate the form. It can also be provided to a third party as evidence of the transaction (e.g., proof of registration or payment).

FIG. 8 illustrates an exemplary receipt. The receipt may include a watermark or an approval confirmation.

Note that in an alternative embodiment the tXt machine may print out the receipt prior to sending the user's information. The receipt may be printed immediately after receipt of the data. The receipt information may be generated locally by the tXt machine or remotely at another location (e.g., the form originator, a trusted third party, etc.). In either case, the receipt is then printed by the tXt machine.

Conceptually, the process may be broken out into two parts, the first part being the printing of a document to open a transaction and the second part being the sending of the filled out document to close the transaction. This process provides immediate benefit for both the form originator and the form user. More specifically, the form originator avoids the costs of transcription and data entry, while the form user receives immediate confirmation of the transaction that can be used, for example, to verify some information with a third party. For example, the receipt given the user can be used to prove to a loan officer that an individual has insurance. Also both the form originator and the form user benefit from the increased accuracy and speed of the communication.

Figure 10:
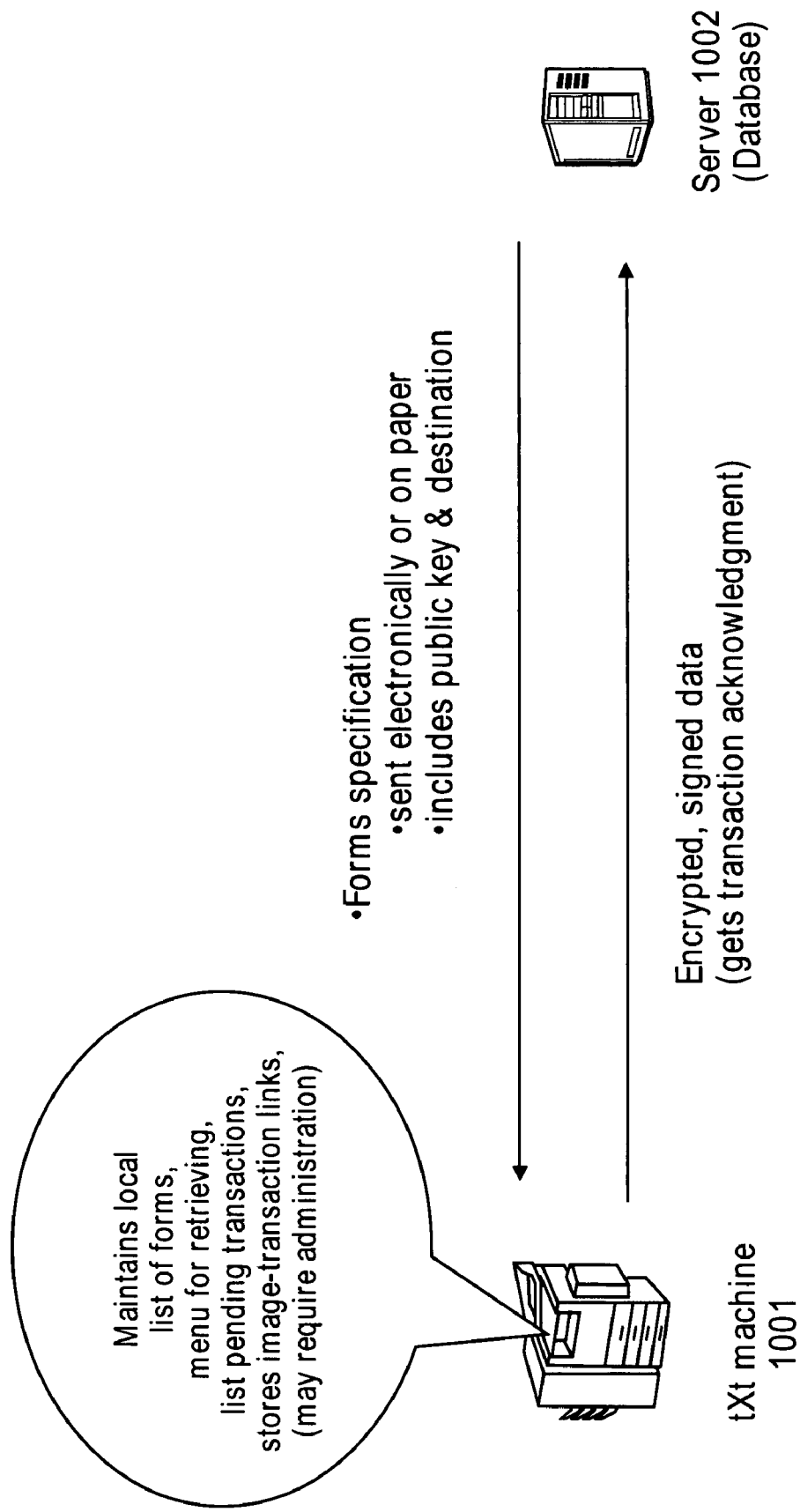
FIG. 10 illustrates one embodiment of a process.

One embodiment of a pictorial description of the above process is given in FIG. 10. Referring to FIG. 10, a tXt machine 1001 maintains a local list of forms, a menu for retrieving forms on the list of forms and a list of pending transactions (e.g., transactions in which a user has printed a form to fill out, yet hasn't had the filled out form scanned into the system for processing), and stores links or other information necessary to submit user entered data associated with each form to a location specified in the digital data on the form. The forms are sent to tXt machine 1001 either electronically or on paper from server 1002, which includes a database of one or more forms. The forms specification provided by server 1002 may include destination information indicating a location to which tXt machine 1001 is to send the user entered information and an indication of the corresponding form once tXt machine 1001 has scanned in and recovered the user entered data. The forms specification provided by server 1002 may also include a public key of server 1002, for use by tXt machine 1001 to encrypt user entered data.

In one embodiment of the system, an intermediary service is responsible for registering forms, machines, and public keys. This intermediary service can provide audit trails to ensure that transactions are completed as expected. Without an intermediary service, additional configuration may be required at the tXt machine (for example, to register and organize blank forms). Also, secure communication will require some outside authentication of the public keys used by both the originator and the tXt machine used to collect the data.

Figure 11:
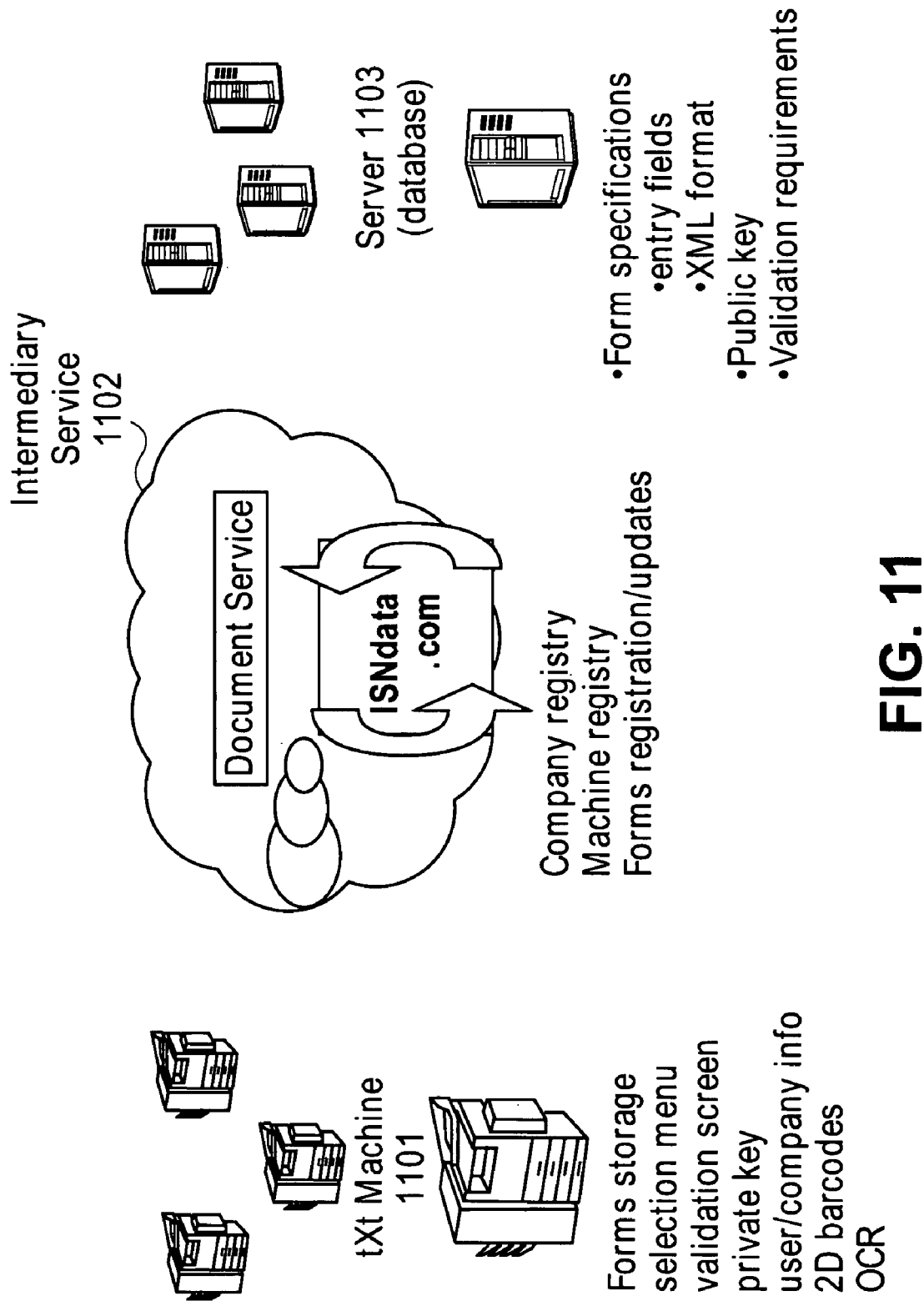
FIG. 11 illustrates one embodiment of an architecture that uses an intermediary service.

FIG. 11 illustrates one embodiment of an architecture that uses an intermediary service. Referring to FIG. 11, a server 1101 having a data base stores the form specifications. As discussed above, the form specifications specify the entry fields and a format that the user entered data is to be sent to the location information stored in the digital information (e.g., barcode) on the form. In one embodiment, the user information along with information identifying the corresponding form associated with the user entered data is to be formatted in an XML document that is to be forwarded to the location specified in the digital information on the form. In one embodiment, server 1101 also stores its public key and validation requirements. Validation requirements may indicate what user entered information must be verified by the user, the areas of the form that do not undergo OCR, and/or may include information to ensure that user entered data conforms to some specific format (e.g., all numbers, a valid date, etc.)

The tXt machine 1103 stores forms or accesses the forms from intermediary service 1102. In one embodiment, tXt machine 1103 includes a menu selection and validation screen to facilitate receiving user input. The tXt machine 1103 includes a scanner to scan input and processing capabilities (e.g., one or more processors operating with software, including OCR software) to process two-dimensional barcodes or other encoded digital information and other scanned information that may be on forms and recover user entered information. In one embodiment, tXt machine 1103 may also include storage for its private key and user and company information. This embedded cryptography key may be used to authenticate itself in transactions with the form originator, such as server 1103, or other machines, or an intermediary service, such as intermediary service 1102.

Intermediary service 1102 acts an intermediary between machines that print out and scan the forms (e.g., tXt machines) and those machines that provide the forms (e.g., company databases). Intermediary service 1102 stores and maintains in a memory a company registry listing the companies for which it acts as an intermediary, such as the company associated with server 1101. Intermediary service 1102 also registers the forms and updates the forms as necessary. These updates may include new revisions to the forms or, in the case of having the tXt machine printing forms with pre-printed user information, updates to user data.

Intermediary service 1102 also stores and maintains in a memory a listing of machines, such as tXt machine 1103, for which it acts as an intermediary. In one embodiment, the intermediary service 1102 comprises one or more servers with storage or other memory for form storage.

Figure 12:
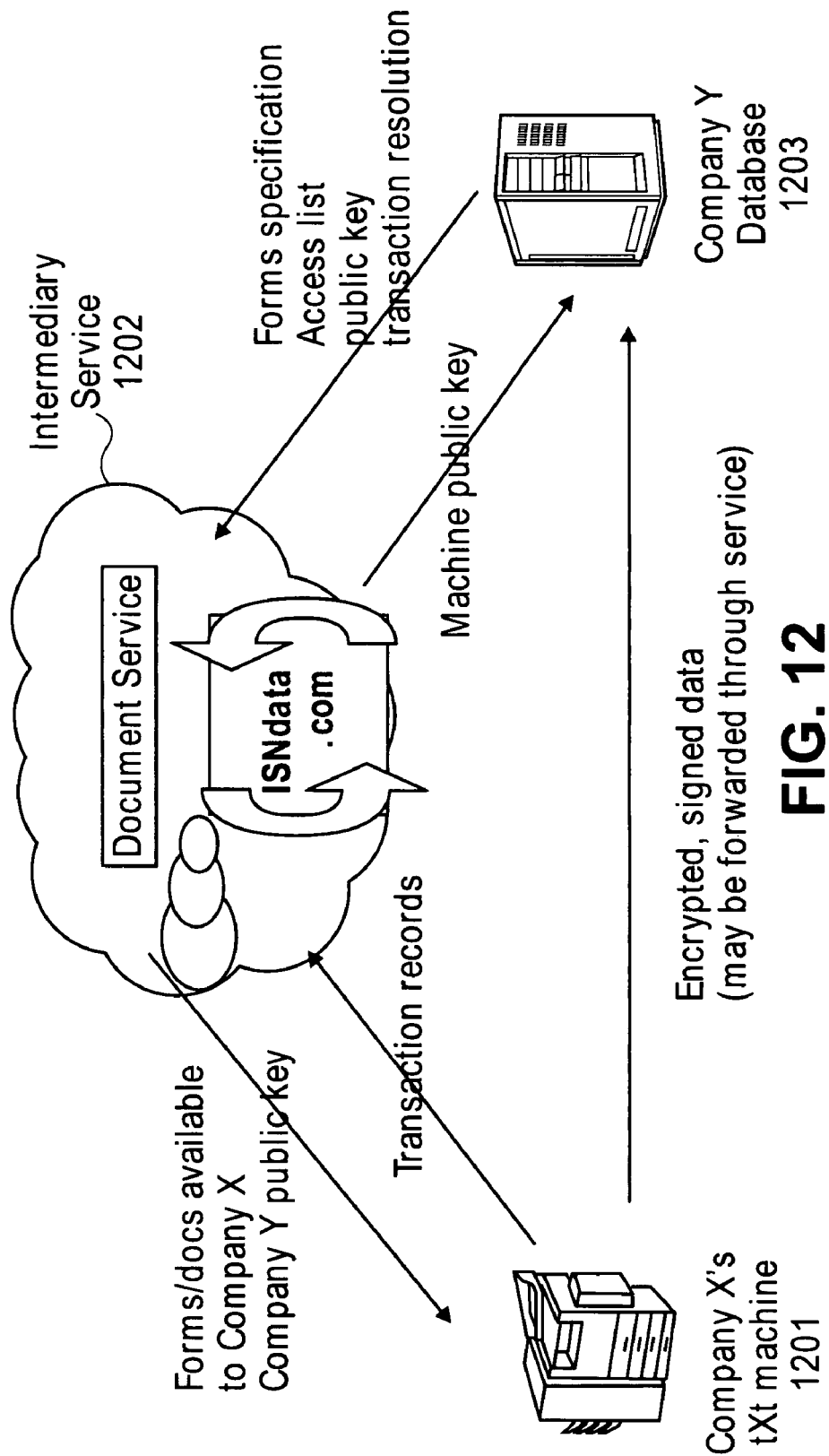
FIG. 12 is a block diagram of one embodiment of an architecture having an intermediary service that includes third party authentication.

FIG. 12 is a block diagram of one embodiment of an architecture having an intermediary service that includes third party authentication. Referring to FIG. 12, forms and documents are made available to tXt machine 1201 through intermediary service 1202, along with the public key of the form originator, server 1203. Using the public key of server 1203 and its own private key, tXt machine 1201 may encrypt any information that is to be sent to server 1203 to another location, such as user entered data and corresponding form information. Such information may be sent directly to server D03, a location specified by server 1203 on the corresponding form associated with the user entered information being sent, or to indirectly to server D03 (or the form specified location) through intermediary service 1202. Server 1203 is then able to decrypt the information using its private key and the public of tXt machine D001, which may have been received by server 1203 from intermediary service 1202.

Figure 14:
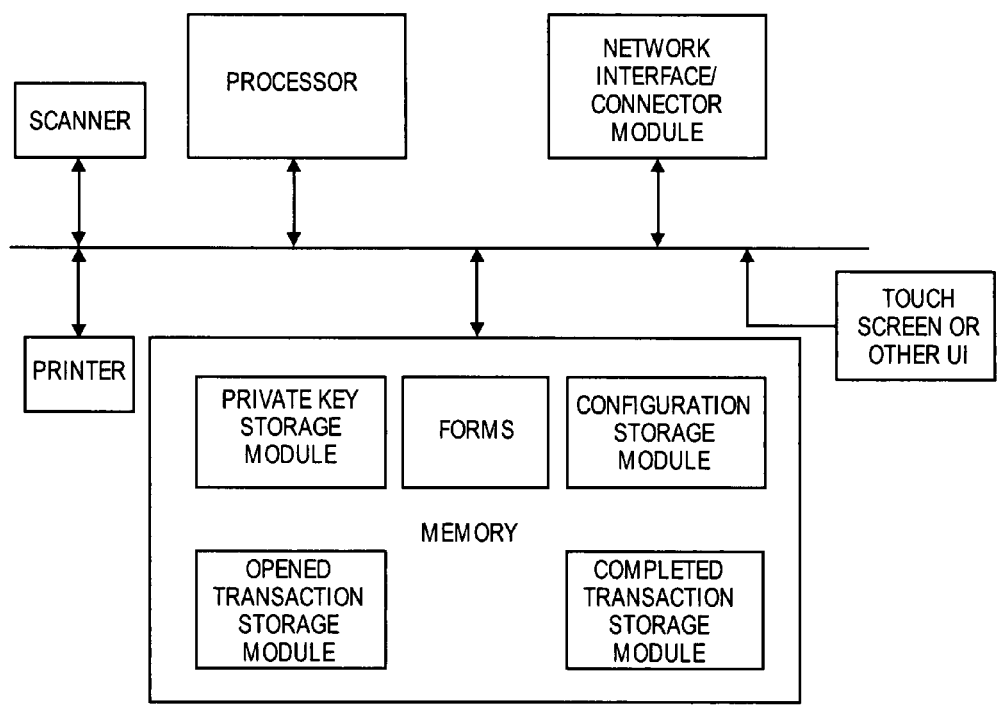
FIG. 14 illustrates processor/memory/network module.

In one embodiment, a tXt machine is configured with local storage that contains a private key, list of users (ID, names, passwords), list of forms, images/meta-data of scanned in forms, address book, etc. The latter items may be local copies of information stored elsewhere, e.g., the intermediary service. FIG. 14 illustrates one embodiment of a tXt machine. In alternate embodiments, this information may be obtained dynamically through one or more services by, for example, verifying a user id and password.

Note that the communication between a tXt machine, an intermediary service and a server as discussed above may be via a network environment such as, for example, the Internet.

An Exemplary Form Registration Process

In one embodiment, the form registration process may comprise an intermediary service receiving an initial request from a tXt machine indicating that they are a member of corporation A's tXt machines, a form originator indicating to the intermediary service that a particular form is for all tXt machines of corporation A, and the intermediary service then sending the form to the tXt machines of corporation A. The forms may be encrypted by the form originator prior to sending to the intermediary service to prevent unauthorized access to the information in the forms. In one embodiment, the forms may be encrypted using the public key of a tXt machine. When forms are encrypted, the encrypted information is sent in a wrapper that includes information, such as the form ID and destination tXt machine. This allows the intermediary service to forward the form to the correct destination and be able to track which forms have been sent to various tXt machines, while not having access to the information in the form itself.

Figure 13:
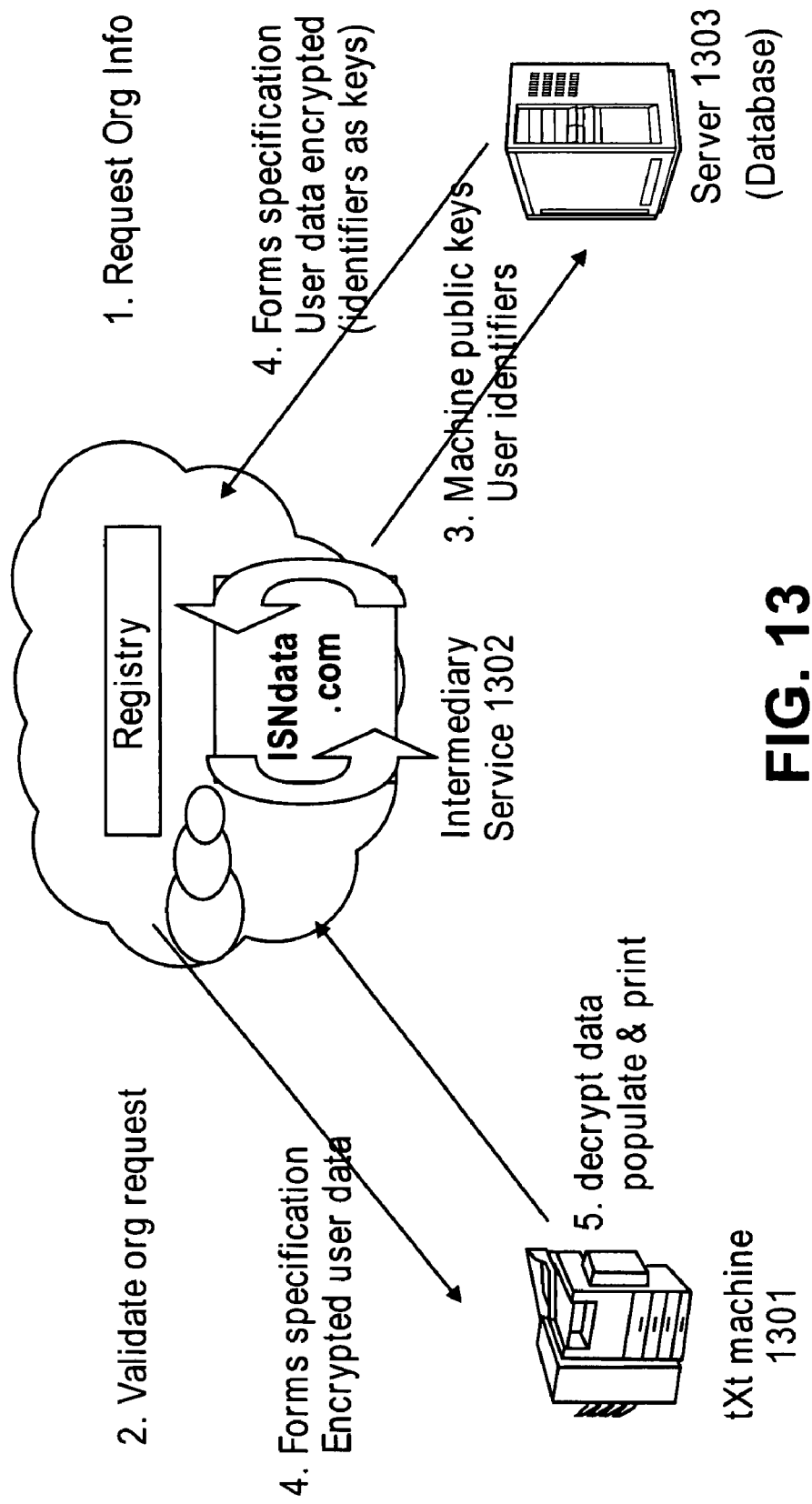
FIG. 13 illustrates one embodiment of a form registration process using secure private data performed by an architecture that includes an intermediary service.

FIG. 13 illustrates one embodiment of a form registration process using secure private data performed by an architecture that includes an intermediary service. Referring to FIG. 13, the process begins with a request for organization information from tXt machine 1301 to intermediary service 1302. Intermediary service 1302 validates the organization information request from tXt machine 1301 and sends the request to server 1303 along with the public key of tXt machine 1301 and user identification information. Using the user identification information, server 1303 locates user data associated with the user identification information and sends to intermediary service 1302 a form specification with the data encrypted using the public key of tXt machine 1301 and its own private key. Intermediary service 1302 forwards this information to tXt machine 1301, which decrypts the data using its private key and the public key of server 1303 and prints the form for the user.

An Exemplary Form Specification

An exemplary form specification is given below.

```
<?xml version="1.0" encoding="UTF-8"?>
<?-- a simple example form specification -->
<txt:form baseDocument*="form555.pdf" formId*="555"
   numpages*="1"
   originator="CompanyA"
     originatorPublicKey="XXXXX"
     destination="forms.companyA.com/form555.cgi"
   destinationPublicKey="XXXXX"
     txtMachine*="CompanyB_tXt01"
       txtPublicKey*="XXXXX">
<!-- in the standard case, a bar-code representing the up-to-
   date contents of this specification, along with the current
   values of the fields below would be added to (e.g. super-
   imposed on) the baseDocument image before printing in
   response to a user request -->
   <txt:barcode page="1" x="500" y="10" maxheight="50"
      maxwidth="500" type="PDF414"/>
   <txt:fields>
      <!-- describes the location and type of each area to be
         entered by user -->
      <txt:variable varId="UserName" page="1" x="30"
         y="1000" height="25" width="200">
         <txt:constraint          type="AlphaNumeric"
            validate="userAcknowledge"/>
         <txt:defaultValue>&UserID;</txt:defaultValue>
         <!-- currentValue would normally be filled in by the
            tXt machine from user input or substitution of
            defaultvalue -->
         <txt:currentValue*></txt:currentValue -->
      </txt:variable>
   <txt:variable varId="Date" page="1" x="500" y="1000"
      height="25" width="100">
      <txt:constraint type="Date" validate="format">
         <range minYear="1900" maxYear="2100"/>
      </txt:constraint>
      <txt:defaultValue>&Today;</txt:defaultValue>
      <txt:currentValue*></txt:currentValue>
   </txt:variable>
   <txt:variable  varId="AccountID" page="1"  x="500"
      y="900" height="25" width="100">
      <txt:constraint           type="numeric"
         validate="userAcknowledge">
         <range min="1000000" max="9999999"/>
         <!-- other constraints could involve consistency
            checks between fields, or more complicated busi-
            ness logic -->
      </txt:constraint>
      <txt:currentValue*></txt:currentValue>
   </txt:variable>
   <txt:variable  varId="Signature"  page="1"  x="500"
      y="200" height="50" width="300">
      <txt:constraint type="ink" validate="non-null"/>
         <!-- in the case of ink, current value might contain
            binary data representing a bitmap, or a pointer to a
            file containing the image Since the original image of
            the scan document is also maintain, this separate
            image of the is not strictly necessary but often
            convenient -->
         <txt:currentValue*></txt:currentValue>
   </txt:variable>
</tzt:form>
<!-- Items marked with a * may be generated or updated by
   the tXt machine. Other items would generally be provided
``` by the form originator. Many additional items may be included in a spec but have been omitted here for clarity- ->

Alternative Embodiments

Note that there are many additional variations of this methodology.

In one embodiment, the tXt machine applies one or more transaction fees. These may have to be paid by the form originator and/or the form user. These transaction fees may be included in a recurring service fee or billing for maintenance of the tXt machine. The fees may be collected by the intermediary service.

In one embodiment, when the intermediary service delivers the data from a tXt machine to a form originator, the intermediary service keeps track of the transaction. In this manner, the intermediary service maintains an audit trail for the transactions.

The paper version of the form can be sent directly to the form originator (without the form user using a tXt machine), such that the form originator (or another party) can then using his tXt machine to complete this process.

Similarly, a standard fax machine can be used to send the form to the location specified by the form originator. A receipt can then be faxed back to the form user. The form user corrects any errors by marking on the receipt and faxing it back to the form originator within a given period of time (after which the data is considered to be validated).

In one embodiment, the tXt machine has a Web server that allows the form to be filled out electronically through a Web browser. This could also allow partial filling out before printing. After partially filling out a form electronically using a Web browser, the form can be printed and completed on paper. Alternately, the form can be filled out entirely in the Web browser and submitted electronically. The receipt may automatically print out or just be shown in the Web browser.

Instead of, or in addition to, OCR, manual transcription by a third party can also be applied to the form image before the form user validates the data.

Copyright Fee Collection

Note that the original items registered with a tXt machine or intermediary service need not be limited to forms. Other copyrighted material may be registered and accessible through tXt machines. In one embodiment, after requesting copyrighted material (similar to requesting a form to be printed out), the system used by the material supplier encrypts the material with the public key of the tXt machine, and then sends the encrypted material to the machine, from which it may be printed out. Notice of this transaction may be sent to the intermediary service and appropriate fee added to the bill. An optional digital mark on the print out identifies the transaction and serves as verification that the fee has been paid.

Dynamic Form Generation

In some circumstances, it may be desirable to generate a form dynamically. For example, a customer at a copy shop may incur charges associated with copying documents. After using a modified MFP, the user indicates they are done and the MFP prints outs a bill with both human and machine-readable information. The customer takes this to the cashier and pays for the services. The cashier uses a tXt machine (some additional items, such as the number of folders purchased might be entered by hand on this form) to calculate the total and print out a receipt.

Task and Comment Lists on Cover Sheets

The tXt machine can maintain a list of tasks or transactions that have started but not completed. For example, the list may include transactions for which the data has been encoded, but has not yet been communicated to the originating organization. These list can be displayed to the users as part of their normal work flow. The cover sheet may be printed along with each print operation started. The cover sheet shows a "to do" list with all of the documents waiting for the user to read, fill out, sign, etc. The list is maintain semi-automatically. Printing a new document adds that item to the user's list (e.g., "to be read" by default). An item can be completed by copying (transcoding) the related form (for items "to be filled out") or simply crossing it off the list (for "to be read" (and putting it back on the platen).

In one embodiment, an electronic interface (e.g., Web browser) exists for the tasks as well.

The tXt process described herein includes a novel combination of technologies methodologies to ensure closed loop indication of important business data.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   scanning a form having a digital description of one or more locations on the form designated for user input;
   recovering user entered data from the form using optical character recognition (OCR) on the one or more locations identified in the digital description;
   providing output with results of the OCR for verification along with alternative results for verification or selection of the alternative results by a user when a confidence level of the results are low;
   receiving user-inputted modifications to the results, if any, wherein the user-inputted modifications, if any, are modified user entered data;
   receiving a verification indication indicating that the modified user entered data is ready to be sent; and
   sending the modified user entered data to a location specified in the digital description.

2. The method defined in claim 1 further comprising registering the form.

3. The method defined in claim 2 wherein registering the form comprises receiving an electronic specification of the form.

4. The method defined in claim 1 wherein recovering user entered data from the form using optical character recognition (OCR) comprises:
   scanning the form;
   decoding the digital description on the form into a form specification;
   locating the one or more locations based on the decoded digital description; and
   performing OCR on the one or more locations to obtain the user entered data.

5. The method defined in claim 1 further comprising printing the form in response to a request.

6. The method defined in claim 5 wherein printing the form comprises pre-populating one or more fields in the form.

7. The method defined in claim 1 further comprising encoding the user entered data prior to sending to the location specified in the digital description.

8. The method defined in claim 7 wherein encoding the user entered data comprises encoding digital data signed with a private key.

9. The method defined in claim 8 further comprising encrypting the encoded digital data signed with a private key using a public key.

10. The method defined in claim 9 wherein the public key is that of an originator of the form.

11. The method defined in claim 1 further comprising printing a receipt as a record to represent that the user entered information has been sent.

12. The method defined in claim 11 wherein the receipt includes digitally encoded data.

13. The method defined in claim 12 wherein the digitally encoded data comprises information to recreate the form with the user entered information.

14. The method defined in claim 1 wherein the digital description comprises a bar code.

15. A method, comprising:
    scanning a form having a digital description of one or more locations on the form designated for user input;
    recovering user entered data from the form using optical character recognition (OCR) on the one or more locations identified in the digital description;
    combining results of the OCR with confidence levels and field grammar;
    providing output with results of the OCR for verification;
    receiving modifications to the results, if any, and a verification indication indicating that user entered data is ready to be sent; and
    sending the user entered data to a location specified in the digital description.

16. A method, comprising:
    scanning a form having a digital description of one or more locations on the form designated for user input;
    recovering user entered data from the form using optical character recognition (OCR) on the one or more locations identified in the digital description;
    providing output with results of the OCR for verification, wherein providing output with result of the OCR for verification comprises displaying the results of the OCR along with alternative results for verification or selection of the alternative results by a user when a confidence level of the results are low;
    receiving user-inputted modifications to the results, if any, wherein the user-inputted modifications, if any, are modified user entered data;
    receiving a verification indication indicating that the modified user entered data is ready to be sent; and
    sending the modified user entered data to a location specified in the digital description.

17. A method comprising:
    scanning a form having a digital description of one or more locations on the form designated for user input;
    recovering user entered data from the form using optical character recognition (OCR) on the one or more locations identified in the digital description;
    providing output with results of the OCR for verification, wherein providing output with result of the OCR for verification comprises displaying the results of the OCR and presenting low confidence results with options on a display;

receiving modifications to the results, if any, and a verification indication indicating that user entered data is ready to be sent; and sending the user entered data to a location specified in the digital description.

18. A method comprising:

registering a form specified electronically;

printing the form in response to a user request;

scanning a printed version of the form;

recovering data entered on the form by performing OCR on locations of the form designated for user input based on digital information printed on the form recovered during scanning;

providing output with results of the OCR for verification, wherein providing output with result of the OCR for verification comprises displaying the results of the OCR along with alternative results for verification or selection of the alternative results by a user when a confidence level of the results are low;

obtaining user verification of the recovered data along with any user-entered modifications to the data; and sending recovered data after any user-entered modifications to the recovered data in an encoded format to a location designated on the form.

19. An article of manufacture including one or more computer-readable media that embody a program of instructions, when executed by one or more processors in the processing system, causes the one or more processors to performing a method, the method comprising:

scanning a form having a digital description of one or more locations on the form designated for user input;

recovering user entered data from the form using optical character recognition (OCR) on the one or more locations identified in the digital description;

providing output with results of the OCR for verification along with alternative results for verification or selection of the alternative results by a user when a confidence level of the results are low;

receiving user-inputted modifications to the results, if any, wherein the user-inputted modifications, if any, are modified user entered data;

receiving a verification indication indicating that the modified user entered data is ready to be sent; and sending the modified user entered data to a location specified in the digital description.

20. The article of manufacture of claim 19 wherein the method for recovering user entered data from the form using optical character recognition (OCR) further comprises:

scanning the form;

decoding the digital description on the form into a form specification;

locating the one or more locations based on the decoded digital description; and performing OCR on the one or more locations to obtain the user entered data.

21. The article of manufacture defined in claim 19, wherein the method further comprises registering the form.

22. The article of manufacture defined in claim 21 wherein the method for registering the form comprises receiving an electronic specification of the form.

23. The article of manufacture defined in claim 19, the method further comprising printing the form in response to a request.

24. The article of manufacture defined in claim 23 wherein the method for printing the form comprises pre-populating one or more fields in the form.

25. The article of manufacture defined in claim 19, the method further comprising encoding the user entered data prior to sending to the location specified in the digital description.

26. The article of manufacture defined in claim 25 wherein encoding the user entered data comprises encoding digital data signed with a private key.

27. The article of manufacture defined in claim 26, the method further comprising encrypting the encoded digital data signed with a private key using a public key.

28. The article of manufacture defined in claim 27 wherein the public key is that of an originator of the form.

29. The article of manufacture defined in claim 19, the method further comprising printing a receipt as a record to represent that the user entered information has been sent.

30. The article of manufacture defined in claim 29 wherein the receipt includes digitally encoded data.

31. The method defined in claim 30 wherein the digitally encoded data comprises information to recreate the form with the user entered information.

32. The article of manufacture defined in claim 19 wherein the digital description comprises a bar code.

33. An article of manufacture including one or more computer-readable media that embody a program of instructions which, when executed by one or more processors in the processing system, causes the one or more processors to performing a method, the method comprising:

scanning a form having a digital description of one or more locations on the form designated for user input;

recovering user entered data from the form using optical character recognition (OCR) on the one or more locations identified in the digital description;

combining results of the OCR with confidence levels and field grammar;

providing output with results of the OCR for verification;

receiving modifications to the results, if any, and a verification indication indicating that user entered data is ready to be sent; and sending the user entered data to a location specified in the digital description.

34. An article of manufacture including one or more computer-readable media that embody a program of instructions which, when executed by one or more processors in the processing system, causes the one or more processors to performing a method, the method comprising:

scanning a form having a digital description of one or more locations on the form designated for user input;

recovering user entered data from the form using optical character recognition (OCR) on the one or more locations identified in the digital description;

providing output with results of the OCR for verification, wherein providing output with result of the OCR for verification comprises displaying the results of the OCR along with alternative results for verification or selection of the alternative results by a user when a confidence level of the results are low;

receiving user-inputted modifications to the results, if any, wherein the user-inputted modifications, if any, are modified user entered data;

receiving a verification indication indicating that the modified user entered data is ready to be sent; and sending the modified user entered data to a location specified in the digital description.

35. An article of manufacture including one or more computer-readable media that embody a program of instructions which, when executed by one or more processors in the processing system, causes the one or more processors to performing a method, the method comprising:

scanning a form having a digital description of one or more locations on the form designated for user input;

recovering user entered data from the form using optical character recognition (OCR) on the one or more locations identified in the digital description;

providing output with results of the OCR for verification, wherein providing output with result of the OCR for verification comprises displaying the results of the OCR and presenting low confidence results with options on a display;

receiving modifications to the results, if any, and a verification indication indicating that user entered data is ready to be sent; and sending the user entered data to a location specified in the digital description.

36. An article of manufacture including one or more computer-readable media that embody a program of instructions which, when executed by one or more processors in the processing system, causes the one or more processors to performing a method, the method comprising:

registering a form specified electronically;

printing the form in response to a user request;

scanning a printed version of the form;

recovering data entered on the form by performing OCR on locations of the form designated for user input based on digital information printed on the form recovered during scanning;

providing output with results of the OCR for verification, wherein providing output with result of the OCR for verification comprises displaying the results of the OCR along with alternative results for verification or selection of the alternative results by a user when a confidence level of the results are low;

obtaining user verification of the recovered data along with any user-entered modifications to the data; and sending recovered data after any user-entered modifications to the recovered data in an encoded format to a location designated on the form.

* * * * *